United States Patent [19]

Gardiner

[11] 4,393,829
[45] Jul. 19, 1983

[54] ROTARY ENGINE

[75] Inventor: William P. Gardiner, Dallas, Tex.

[73] Assignee: W. G. Slow T. (a partnership), Dallas, Tex.

[21] Appl. No.: 187,319

[22] Filed: Sep. 15, 1980

[51] Int. Cl.³ .............................................. F02B 53/00
[52] U.S. Cl. ..................................... 123/249; 418/227
[58] Field of Search ............... 127/236, 238, 246, 249; 418/225, 227

[56] References Cited

U.S. PATENT DOCUMENTS 2,296,768  9/1942  Cochran .......................... 418/227 X
2,454,006 11/1948  Plummer ......................... 418/227 X
2,944,533  7/1960  Park ..................................... 123/249
4,057,035 11/1977  Su .................................... 418/227 X Primary Examiner—William A. Cuchlinski, Jr.
Attorney, Agent, or Firm—Hubbard, Thurman, Turner & Tucker

[57] ABSTRACT

A rotary engine has separate combustion chambers and expansion chambers. A two-step combustion cycle provides for a burning step in the combustion chambers, and a separate combustion step in the expansion chambers. During operation, the rotary engine compresses air for use in a fuel injection supply.

7 Claims, 9 Drawing Figures

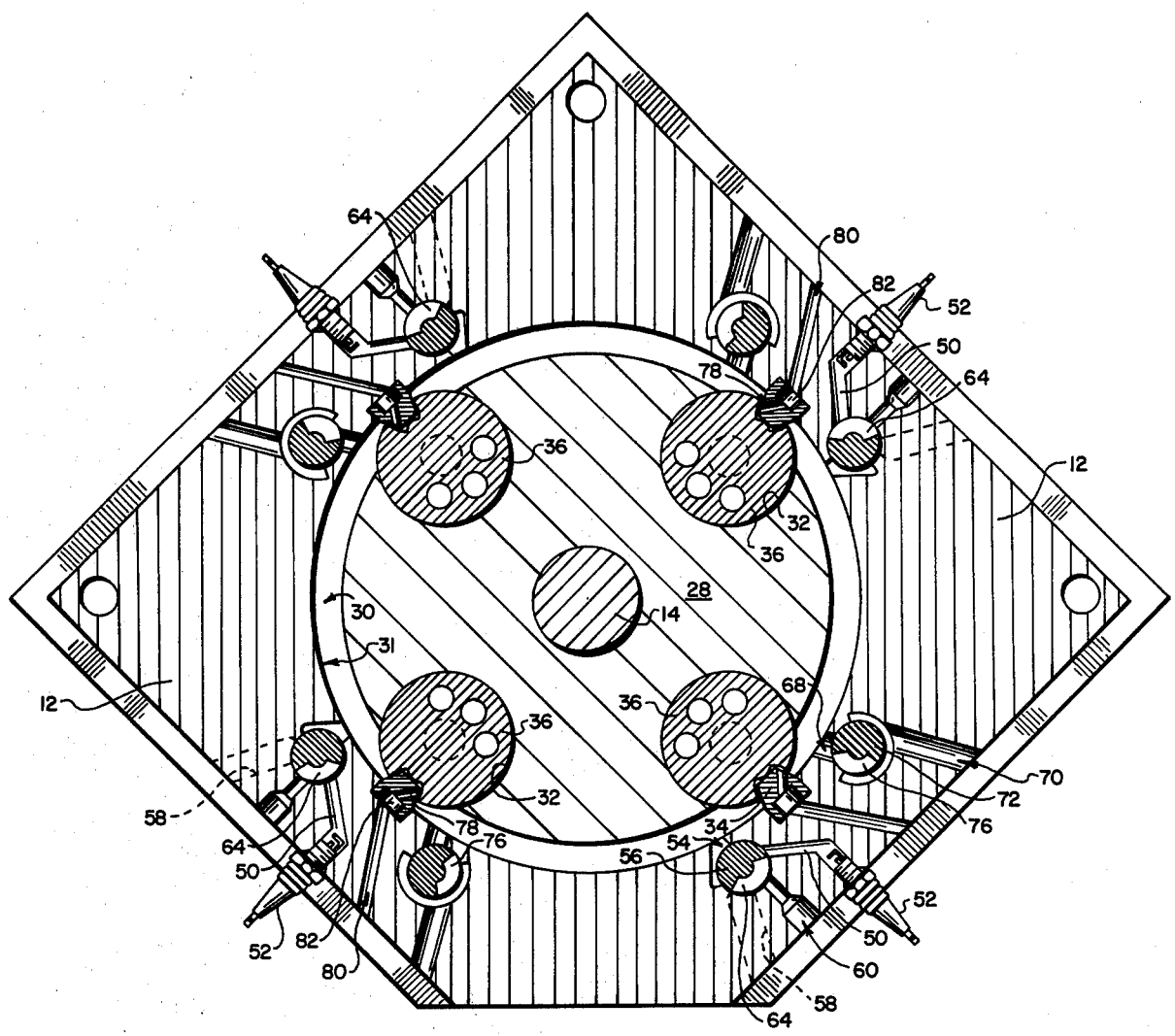
FIG. 3
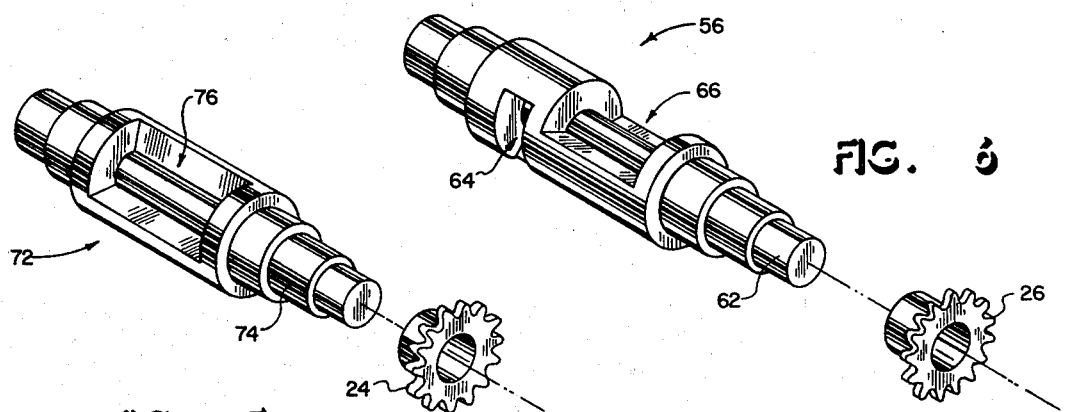
FIG. 5
FIG. 6

ROTARY ENGINE

BACKGROUND OF THE INVENTION

1. Field of the Invention

The present invention relates to rotary internal combustion engines and in particular to rotary engines having a separate combustion chamber.

2. Description of the Prior Art

In an attempt to overcome many of the inherent drawbacks in internal combustion reciprocating engines, a wide variety of approaches toward developing internal combustion rotary engines have been developed. Many approaches adopt the traditional four-cycle approach of compressing a combustible fuel mixture in the same chamber where combustion and expansion occur. This type of arrangement leads to incomplete combustion and a high level of noxious pollutants.

Rotary engines generally have developed unique problems stemming from their special nature. Foremost among these is sealing of the various chambers from each other. This is usually solved to some degree through the use of spring loaded vanes which slide along various surfaces. Another problem is that of imbalance. Irregularly shaped rotating parts or combustion limited to one area of the engine tends to cause vibration which must be compensated.

Another limitation on internal combustion engines in general is their inability to provide high torque at low speed and relatively constant torque over a wide range of speed. Internal combustion engines are traditionally limited in the types and quality of fuel which they may use.

SUMMARY OF THE INVENTION

In accordance with the present invention, a rotary engine has combustion chambers isolated from a cylindrical bore. A cylindrical rotor is rotatably mounted in the bore, defining an annular chamber between the rotor and the bore wall. A plurality of quadrant dividers project radially inward from the bore wall and form a viscous seal with the rotor. As the rotor rotates, an equal number of vanes make virtually airtight contact with the bore wall and with the quadrant dividers as the vanes pass them. Appropriate valving controls the flow of combustible fuel, air, and exhaust gases.

An object of the present invention is to provide an internal combustion engine that has a high torque output at low rpm. Another object is to provide a substantially constant torque over a wide range of rpm. An engine designed according to the present invention accomplishes these objectives. Thrust is developed perpendicular to the bore radius, providing maximum torque from the power produced by combustion.

A further object of the present invention is to provide for smooth operation and low internal friction, which increases engine efficiency. In accordance with one aspect of the invention, the preferred embodiment provides a plurality of combustion chambers substantially equally spaced around the circumference of the bore. The sealing vanes are rotary cylindrical vanes, and are equally spaced around the rotor. All primary moving parts are rotating cylinders, and the engine is symmetrically balanced, providing for smooth operation. The rotary vanes make rolling instead of sliding contact with the bore walls and the quadrant dividers. This aspect provides for extremely low frictional losses, and avoids common sealing problems of sliding seals. Frictional losses are confined to the ball bearings supporting the rotating elements, resulting in minimum loss.

Another object of the present invention is to provide for a low parts count and ease of manufacture. The preferred embodiment provides for an engine which is symmetrical and has many identical parts. Thus, a minimum number of basic molds or forms can be used to create all necessary parts which may be used interchangeably. All control of fluid flow is accomplished by two rotary valves for each combustion chamber, thereby providing that the complex fluid control is accomplished by the minimum number of parts.

Another object is to provide for efficient operation with a wide variety of fuels. According to one aspect of the preferred embodiment, combustion of the fuel-air mixture is accomplished while the combustion chamber is isolated from the bore of the engine. Complete combustion of all types of fuel occurs during this period of isolation of the combustion chamber, and no change is necessitated in engine operation by the change of fuels. After complete combustion, the burned gases are passed into the bore and used to do work.

This aspect accomplishes the further objective of creating few pollutants in the exhaust because the fuel is completely burned in the combustion chamber before being expanded and cooled.

Another object is to provide for an engine with a high power-to-weight ratio. According to an aspect of the preferred embodiment, a second, separate combustion step occurs within the bore. As the burned gases from the combustion chamber enter the bore, fresh combustible fuel mixture contained therein is ignited by the hot, burned gases. This second combustion step is not required by the invention, but generates additional power and creates a high torque.

In the preferred embodiment, a combustible fuel mixture is provided under pressure to the combustion chamber. It is yet another object of the present invention to provide compressed atmospheric air as an integral part of the combustion cycle. According to the preferred embodiment, this is accomplished by compressing the air ahead of the rotary vanes while burned gases are expanding behind them. According to the preferred embodiment, more air is compressed in this step than is used in the combustion of the fuel, therefore allowing a separate air tank to be used as a regulated air supply, which provides for a better controlled fuel mixture and higher efficiency.

The novel features which characterize the present invention are defined by the appended claims. The foregoing and other objects and advantages of the present invention will hereinafter appear, and for purposes of illustration, but not of limitation, an exemplary embodiment is shown in the drawings.

BRIEF DESCRIPTION OF THE DRAWINGS

FIG. 3 is a sectional view taken along the line III—III of FIG. 1;

FIG. 5 is a perspective view of an exhaust valve;

FIG. 6 is a perspective view of an intake valve;

DETAILED DESCRIPTION

Figure 1:
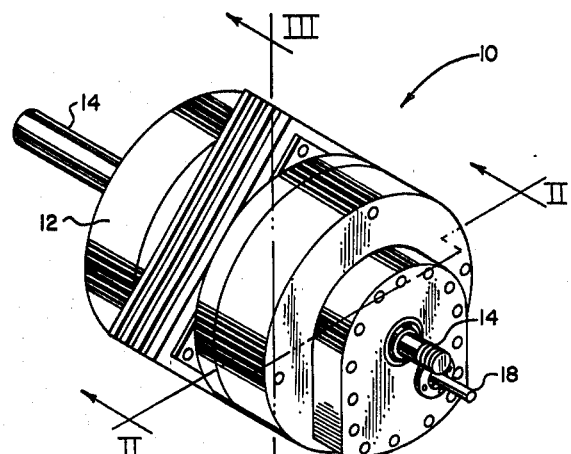
FIG. 1 is a perspective view of a rotary engine.

Referring to FIG. 1, a rotary engine 10 has an engine casing 12. A drive shaft 14 runs through the center of the engine casing 12, and extends beyond both ends. One end is connected to a transmission (not shown) and the other is a power take-off for other apparatus as desired. A timing shaft 18 extends from one end of the engine casing 12. The speed of rotation of the timing shaft 18 is a function of the rotational speed of the drive shaft 14, and is used in timing the ignition system (not shown).

Figure 2:
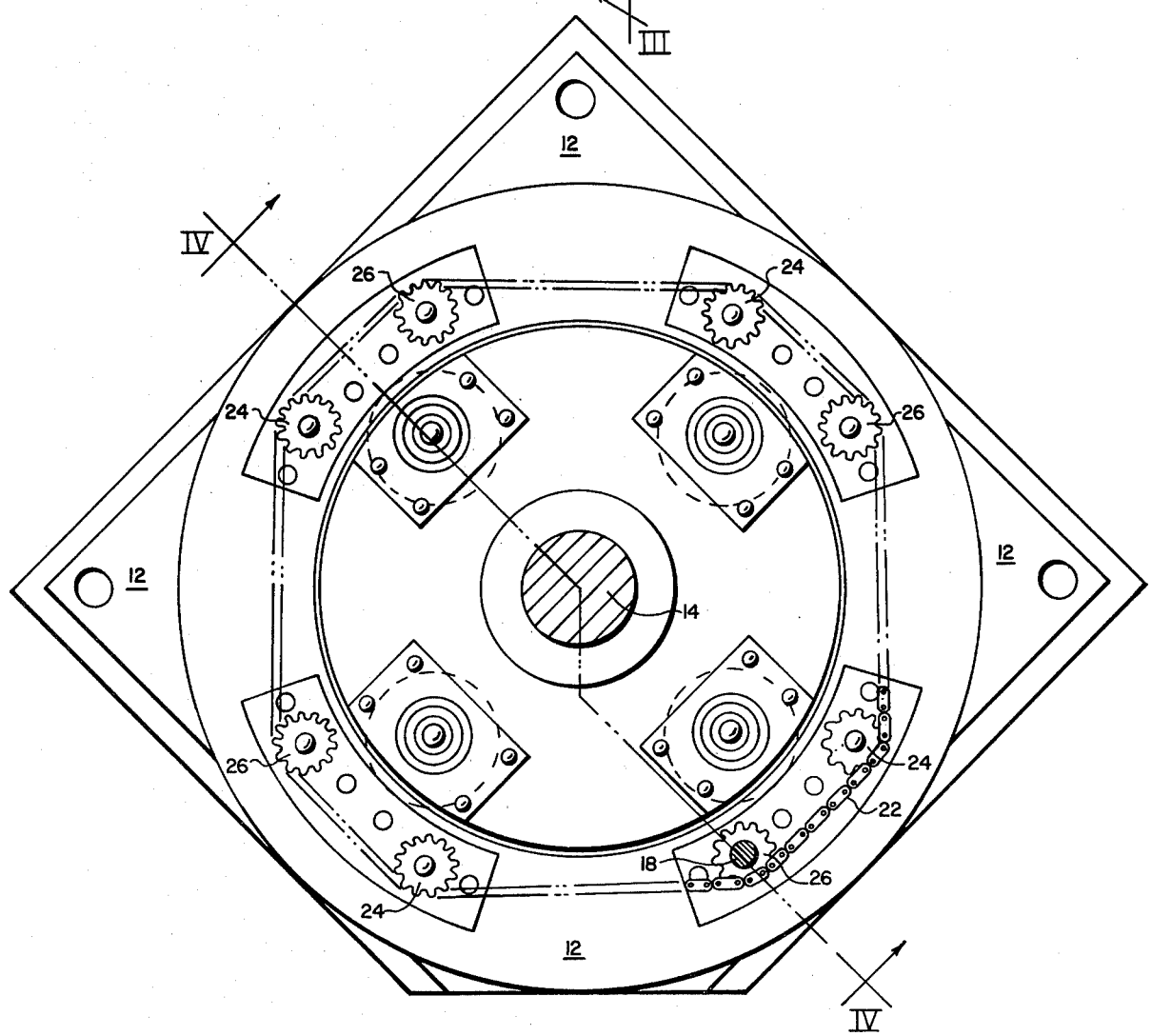
FIG. 2 is a sectional view taken along the line II—II of FIG. 1.
Figure 4:
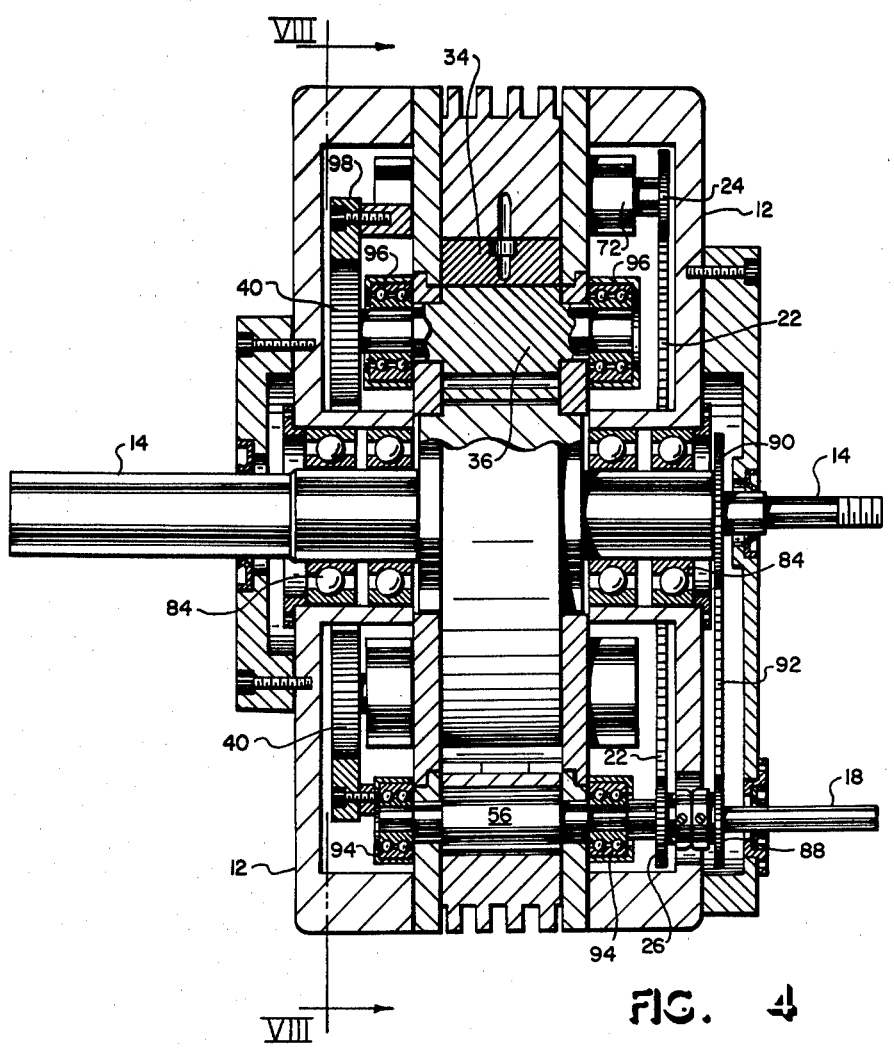
FIG. 4 is a cross sectional view taken along the line IV—IV of FIG. 2.

Referring to FIG. 2, a cross sectional view of the engine casing 12 is shown along the drive shaft 14 from the power take-off end. A timing chain 22 is an endless chain which engages four exhaust valve spockets 24 and four intake valve sprockets 26. The timing shaft 18 is coupled to one intake valve sprocket 26. The timing shaft 18 is driven as shown in FIG. 4, causing the timing chain 22 to be driven in a clockwise direction as seen from the perspective of FIG. 2. Movement of the timing chain 22 causes all intake and exhaust valve sprockets 24, 26 to be driven at the same rate in a clockwise direction. The shaft 14 also rotates clockwise.

Figure 9:
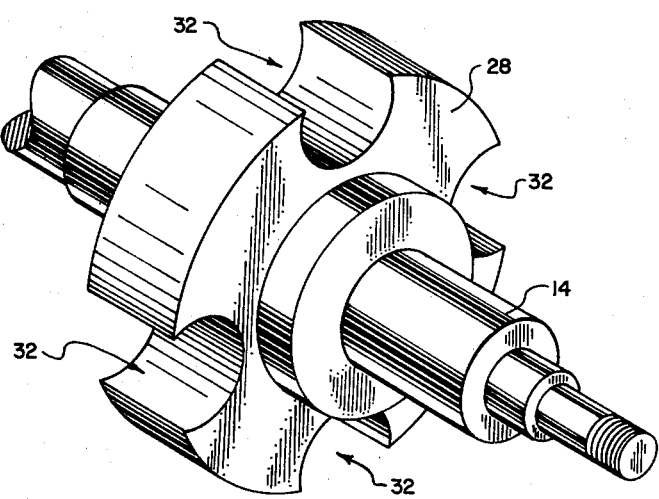
FIG. 9 is a perspective view of a rotor.

Referring to FIG. 3, a rotor 28 is fixedly attached to the drive shaft 14. A perspective view of the rotor 28 is shown in FIG. 9. The rotor 28 and the drive shaft 14 form an integral piece. Four vane chambers 32 are equally spaced around the circumference of the rotor 28. The vane chambers 32 are shaped to receive a cylinder which will project beyond the circumference of the rotor 28.

Returning to FIG. 3, the housing 12 has a bore 30 defined by a bore wall 31. The radius of the bore 30 is larger than the radius of the rotor 28. Equally spaced around the bore wall 31 and projecting radially inward are four quadrant dividers 34. The quadrant dividers 34 project inward a distance substantially equal to the difference between the radii of the bore 30 and the rotor 28. A viscous seal is formed between the quadrant dividers 34 and the rotor 28.

Figure 7:
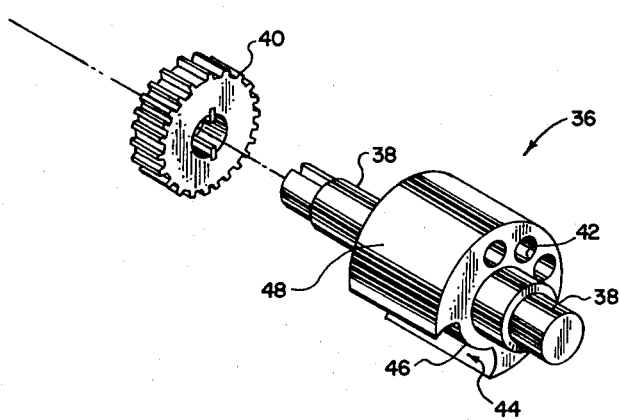
FIG. 7 is a perspective view of a rotary vane.

Contained within the vane chambers 32 are cylindrical rotary vanes 36. A perspective view of one rotary vane 36 is shown in FIG. 7. The vane 36 is mounted on a vane axis 38. A vane gear 40 is coupled to one end of the vane shaft 38. Three cutouts 42 are used to balance a vane notch 44. An inner surface 46 of the vane notch 44 is arcuate and concentric with an outer surface 48. The radial distance between the inner surface 46 and the outer surface 48 is equal to the radial height of the quadrant dividers 34.

Returning to FIG. 3, the vanes 36 are shown in place in the vane chambers 32. The vanes 36 project beyond the circumference of the rotor 28 so that as the rotor 28 turns, the outer vane surface 48 will make rolling contact with the bore wall 31. The vane notch 44 and the quadrant dividers 34 are shaped so that the vanes 36 will roll smoothly over the quadrant dividers 34 as the rotor 28 rotates, and a viscous seal will be maintained at all times between the quadrant dividers 34 and the inner vane surfaces 46, so that substantially no gases will pass between the spaces on either side of the quadrant dividers 34. A viscous seal is also maintained between the outer vane surface 48 and the bore wall 31 when the vanes 36 are between the quadrant dividers 34.

Substantially equally spaced around the bore 30 are four combustion chambers 50. Combustible fuel mixture contained in the combustion chambers 50 is ignited by sparkplugs 52. Intake ports 54 located near to and clockwise of each quadrant divider 34 connect the bore 30 with the combustion chamber 50 through rotary intake valves 56. During a portion of its rotation, each intake valve 56 also connects an atmospheric air passage 58 and a fuel and high pressure air supply passage 60 to the intake port 54.

A perspective view of an intake valve 56 is shown in FIG. 6. The intake sprocket gear 26 is mounted on an intake valve shaft 62. The rotation of the intake valve 56 is controlled by the timing chain 22 through the intake valve sprocket 26 as shown in FIG. 2. The intake valve 56 has an air notch 66 which is spaced axially from and not in fluid connection with a fuel notch 64. In FIG. 3, the position of each intake valve 56 is indicated by showing the position of the fuel notch 64.

Counterclockwise from the quadrant dividers 34 are exhaust ports 68. An exhaust passage 70 is in fluid connection with the bore 30 through the exhaust port 68 during a portion of each rotation of rotary exhaust valves 72.

A perspective view of an exhaust valve 72 is shown in FIG. 5. The exhaust valve sprocket 24 is coupled to an exhaust valve shaft 74. Rotation of the exhaust valve 72 is controlled by the timing chain 22 as shown in FIG. 2. The exhaust valve 72 has an exhaust notch 76 to provide fluid connection between the exhaust ports 68 and the exhaust passages 70. The position of the exhaust valves 72 is represented in FIG. 3 by showing the location of the exhaust notch 76.

An air pressure port 78 extends through each quadrant divider 34 into the interior of the bore 30. A pressurized air passage 80 is in fluid communication with the air pressure port 78 through a reed valve 82. The reed valve 82 operates so that gases will never flow from the pressurized air passage 80 to the air pressure port 78, and gases will flow from the air pressure port 78 to the pressurized air passage 80 only when the pressure in the air pressure port 78 exceeds that in the pressurized air passage 80.

The operation of the rotary engine 10 will be discussed in relation to FIG. 3. The atmospheric air passages 58 and the exhaust passages 70 are in direct fluid communication with the outside air. The pressurized air passages 80 are connected to an air storage tank (not shown) containing air under pressure, through any appropriate valving such as a check valve (not shown) located near the air storage tank. A combustible mixture of air and fuel under pressure is constantly injected into the fuel supply passageway 60. Pressurized air is supplied from the air storage tank and pressurized fuel is provided by an appropriate fuel pump (not shown).

The shaft 14 and rotor 28 rotate in a clockwise direction as seen from the perspective of FIG. 3. The vanes 36 rotate in a counterclockwise direction and make a rolling contact with the bore walls 31 and with the quadrant dividers 34. The following explanation will discuss the events which take place at the lower right hand combustion chamber 50 and associated mechanics. The vane 36 shown in contact with the lower right hand quadrant divider 34 will be referred to as the first vane 36. The vane 36 counterclockwise of the first vane 36 will be referred to as the second vane 36, and the vane 36 diametrically opposite the first vane 36 is referred to as the third vane 36.

The clockwise rotation of the intake valve 56 has just closed off the combustion chamber 50. The combustion chamber 50 is full of a combustible fuel mixture under pressure which is ignited by the sparkplug 52. The burning fuel mixture is entirely contained within the combustion chamber 50 and is completely burned.

While the fuel mixture in the combustion chamber 50 is burning, the rotor 28 has traveled a portion of a turn in the clockwise direction. The first vane 36 has rolled along the bore wall 31 until the point of contact is clockwise of the intake port 54. This forms an airtight chamber between the quadrant divider 34 and the vane 36. The intake valve 56 has now rotated until the fuel supply passage 60 is in fluid communication with this newly formed chamber through the fuel notch 64. The combustible fuel mixture under pressure enters the space between the vane 36 and the quadrant divider 34 until the intake valve 56 rotates further around and closes off the fuel supply passage 60.

Due to previous operation of the engine 10, burned gases are contained in the space counterclockwise from the lower right hand quadrant divider 34. The exhaust valve 72 is rotated so that the exhaust port 68 and the exhaust passage 70 are in fluid communication, and the burned gases are vented to the outside air. As the second vane 36 rotates toward the quadrant divider 34, all of the burned gases are exhausted to the atmosphere.

The intake valve 56 continues its clockwise rotation. Shortly after the fuel supply passage 60 is isolated from the intake port 54, the intake valve 56 establishes fluid communication through the air notch 66 between the combustion chamber 50 and the intake port 54. The firing of the sparkplug 52 is preferably timed so that the fuel mixture in the combustion chamber 50 is completely burned a short but finite period of time before fluid communication is established with the intake port 54. The hot combusted gases expand out of the combustion chamber 50 through the intake port 54. In a second step of combustion, these gases ignite the unburned fuel mixture contained between the vane 36 and the quadrant divider 34. The expansion of gases burned in the combustion chamber 50 plus the expansion due to the burning of the fuel mixture in the second combustion step creates the motive power for the rotary engine 10.

The rotor 28 continues its clockwise rotation, and the first vane 36 moves toward the lower left hand quadrant divider 34. The burned gases located between the vane 36 and the lower right hand quadrant divider 34 expand and cool. As the second vane 36 approaches the quadrant divider 34, all of the exhaust gases which were counterclockwise of the quadrant divider 34 are passed through the exhaust port 68. As the second vane 36 passes over the quadrant divider 34, rotation of the exhaust valve 72 seals off the exhaust port 68. At this time, rotation of the intake valve 56 seals off the intake port 54. As the second vane 36 rolls past the intake port 54, rotation of the intake valve 56 causes the air notch 66 to establish fluid communication between the atmospheric air passage 58 and the intake port 54. As the second vane 36 continues to move around the bore 30 in a clockwise direction, fresh atmospheric air is drawn into the space between the departing second vane 36 and the quadrant divider 34.

At about this time, rotation of the intake valve 56 positions the fuel notch 64 so as to cause fluid communication between the fuel supply passage 60 and the combustion chamber 50. The combustion chamber 50 receives a new charge of combustible fuel mixture under pressure.

As the third vane 36 approaches the quadrant divider 34, the gas between the quadrant divider 34 and the approaching third vane 36 is compressed. This gas is fresh atmospheric air which was previously drawn into this space through the operation of the intake valve 56 to the counterclockwise of the quadrant divider 34. As the third vane 36 approaches very near to the quadrant divider 34, the atmospheric air is compressed to a pressure above that of the air storage tank. At this point, the reed valve 82 located between the air pressure port 78 and the pressurized air passage 80 opens, and compressed air moves through the pressurized air passage 80 into the air storage tank. As the third vane 36 moves over the quadrant divider 34, substantially all of the atmospheric air which was contained in the space to the counterclockwise of the quadrant divider 34 passes through the reed valve 82 into the pressurized air passage 80.

As the third vane 36 moves over the quadrant divider 34, rotation of the intake valve 56 closes off the intake port 54 from the atmospheric air passage 58. Also at this point, rotation of the exhaust valve 72 reestablishes fluid communication between the exhaust port 68 and the exhaust passage 70. This allows the burned gases contained behind the third vane 36 to be exhausted from the engine 10. Also at this point, rotation of the intake valve 56 has closed off the combustion chamber 50.

The discussion of the operation of the rotary engine 10 has now progressed through one complete cycle. The combustion chamber 50 under consideration has been charged with a combustible fuel mixture and is ready to fire. Both valves 56, 72 have made one complete rotation and the rotor 28 has made one-half of a rotation. Therefore, the combustion cycle operates twice for each rotation of the rotor 28.

Each pair of diametrically opposite combustion chambers 50 fires at the same time. Thus, the above discussion also takes place at the same time on the opposite side of the bore 30. The remaining pair of combustion chambers 50 fire together and at the midpoint in time between the firing of the first pair. The operation of the valving is identical for each combustion chamber 50. Therefore, each combustion chamber 50 fires twice for each full revolution of the rotor 28.

The two diametrically opposite vanes 36 which are being moved by the expanding products of combustion are at the same time compressing fresh atmospheric air to be used in the air storage tank. The remaining two vanes 36 are expelling the combusted fuel gases in front of them while drawing in fresh atmospheric air behind them to be compressed in the next cycle. In the present embodiment, one pair of vanes 36 always receives the thrust of the burning fuel mixture and compresses air, while the other pair always exhausts burned gases and draws in fresh air.

Referring to FIG. 4, additional details necessary to the proper operation of the preferred embodiment are shown. The drive shaft 14 is journaled in the engine casing 12 at both ends by drive shaft ball bearings 84.

The timing shaft 18 is coupled to one of the intake valve sprockets 26 as described in FIG. 2. A timing sprocket 88 is coupled to the timing shaft 18, and is driven from the drive shaft 14 through a driving sprocket 90 and a driving chain 92. The timing shaft 18 is an extension of one particular intake valve 56.

The intake valve sprocket 26 rotates the intake valve 56, which is journaled on valve bearings 94, at the same rate as the timing shaft 18. All intake and exhaust valve sprockets 24, 26 are journaled on valve bearings 94, and are linked by the timing chain 22, thereby rotating at the same rate. In the preferred embodiment, all valves 56, 72 rotate twice for each revolution of the drive shaft 14. The proper ratio is set by the ratio of the timing sprocket 88 and the driving sprocket 90.

All cylindrical vanes 36 are journaled on vane bearings 96, and one is shown here as it passes over a quadrant divider 34. The vane gears 40 are engaged by a ring gear 98 to provide for proper rotation of the vanes 36.

Figure 8:
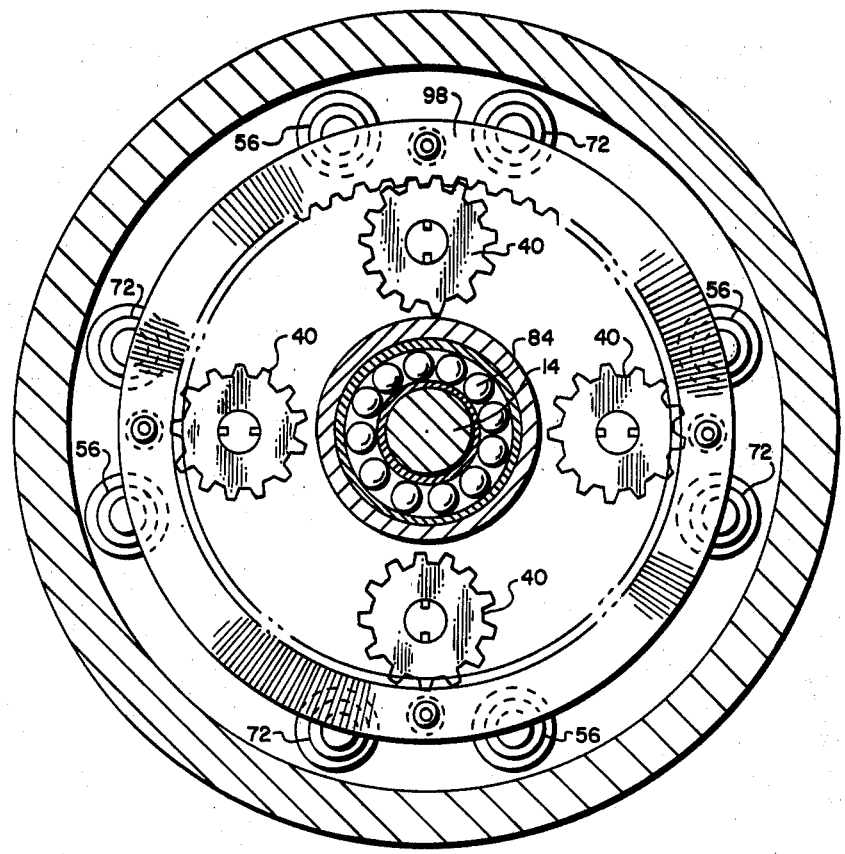
FIG. 8 is a cross section taken along the line VIII—VIII of FIG. 4.

Referring to FIG. 8, a sectional view along the drive shaft 14 better illustrates the positional mechanism for the vanes 36. The vane gears 40 are pinion gears interlockingly engaged with the ring gear 98. The ring gear 98 is fixed to the engine casing 12. This arrangement ensures that there will be no slippage between the vane outer surfaces 48 and the wall of the bore 30, and also that the vane notches 44 will be properly positioned to ensure that the vanes 36 properly cross the quadrant dividers 34.

The relative positions of the intake valves 56 and the exhaust valves 72 are indicated in FIG. 8. From the perspective of FIG. 8, the drive shaft 14 rotates counterclockwise, and the vane gears 40 rotate clockwise.

Although a preferred embodiment has been described in detail, it should be understood that various substitutions, alterations and changes may become apparent to those skilled in the art. These modifications may be made without departing from the scope and spirit of the invention as defined by the appended claims.

What is claimed is:

1. A rotary engine comprising:
a casing having a cylindrical bore and a plurality of combustion chambers spaced circumferentially externally of the bore;
a fuel supply for supplying a combustible fuel mixture;
a drive shaft concentrically received within the bore and journaled for rotation;
a rotor concentrically mounted on said drive shaft and having a radius less than the radius of the bore, and having a plurality of vane chambers equally spaced circumferentially around said rotor;
a plurality of first valves spaced circumferentially around the bore, said first valves alternately establishing and suppressing fluid communication between the bore and the exterior of said casing;
a plurality of second valves spaced circumferentially around the bore, said second valves separately and sequentially establishing and suppressing fluid communication between the bore and the combustion chambers, the combustion chambers and said fuel supply, the exterior of the casing and the bore, and said fuel supply and the bore, respectively;
a plurality of quadrant dividers equally spaced circumferentially around the bore, said quadrant dividers projecting radially into the interior of the bore a distance substantially equal to the difference between the radius of the bore and the radius of said cylindrical rotor, thereby forming a plurality of arcuate chambers; and
a plurality of cylindrical vanes rotatably received within the vane chambers and disposed for rolling contact with the wall of the bore, and each of said vanes having a notch disposed so that said vanes will rollably contact said quadrant dividers while suppressing fluid communication between adjacent pairs of arcuate chambers.

2. The engine of claim 1 wherein said second valves are rotary valves.

3. The engine of claim 1 wherein said first valves are rotary valves.

4. A rotary engine comprising:
a casing with a cylindrical bore and a plurality of combustion chambers spaced circumferentially around the bore;
a drive shaft concentrically received within the bore and journaled for rotation;
a cylindrical rotor concentrically mounted on said shaft and having a radius less than the radius of the bore;
a fuel supply for supplying a combustible fuel mixture;
a plurality of quadrant dividers equally spaced circumferentially on the interior wall of the bore, said quadrant dividers extending radially inward for a distance substantially equal to the difference between the radius of the bore and the radius of said rotor;
a plurality of vanes equally spaced circumferentially around said rotor, said vanes extending substantially radially outward from said rotor a distance sufficient to make contact with the wall of the bore such that there is no fluid communication between the space on either side of the point of contact between said vane and the bore wall, said vanes further disposed such that said vanes may move past said quadrant dividers as said rotor rotates in such a manner that no fluid communication exists between the spaces on either side of the point of contact between said vanes and said quadrant dividers;
a plurality of first valves spaced circumferentially around the bore, said valves alternately creating and suppressing fluid communication between the interior of the bore and the exterior of the casing; and
a plurality of second valves spaced circumferentially around the bore, said second valves operating so that fluid communication is alternately and separately created and suppressed between each of the interior of the bore, the combustion chamber, and said fuel mixture supply, such that the combustion chamber is closed off when fuel mixture contained therein is combusted, and remains closed off for a finite period of time after initial combustion, followed by the establishment of fluid communication between the combustion chamber and the interior of the bore, wherein a second combustion occurs of additional fuel mixture within the interior of the bore.

5. The engine of claim 4 wherein said first valves are rotary valves.

6. The engine of claim 4 wherein said second valves are rotary valves.

7. A rotary engine comprising:
a casing with a cylindrical bore and a plurality of external combustion chambers spaced circumferentially around the bore;
a drive shaft concentrically received within the bore and journaled for rotation;
a cylindrical rotor concentrically mounted on said drive shaft and having a radius less than the radius of the bore, and having a plurality of vane chambers equally spaced circumferentially around said rotor;
a fuel supply for supplying a combustible fuel mixture;
a plurality of quadrant dividers equally spaced circumferentially around the wall of the bore, said quadrant dividers projecting radially inward a distance equal to the difference between the radii of said rotor and the bore, thereby defining a plurality of arcuate chambers equal to the number of combustion chambers;

a plurality of cylindrical vanes disposed within the vane chambers such that rolling contact is maintained at all times with the wall of the bore or said quadrant dividers, such that fluid communication is suppressed between the spaces on either side of the point of rolling contact;

a plurality of first rotary valves spaced circumferentially around the exterior of the bore, said first valves making an integral number of rotations for each rotation of said drive shaft, and alternately enabling and suppressing fluid communication between the interior of the bore and the exterior of the casing once for each rotation of said first valve; and, a plurality of second rotary valves spaced circumferentially around the exterior of the bore, said second valves having first and second notches axially spaced and not in fluid communication, said second valve rotating an integral number of times for each rotation of said drive shaft, wherein the first valve notch separately and sequentially enables fluid communication between said fuel supply and the bore, the bore and the combustion chamber, and the combustion chamber and the fuel supply, respectively, and the second valve notch enables fluid communication between the bore and the exterior of said casing while the first valve notch is enabling fluid communication between the combustion chamber and said mixture supply.

* * * * *